(12) United States Patent
Huang et al.

(10) Patent No.: US 11,371,676 B2
(45) Date of Patent: Jun. 28, 2022

(54) KEYBOARD DEVICE AND BACKLIGHT MODULE THEREOF

(71) Applicant: Primax Electronics Ltd., Taipei (TW)

(72) Inventors: Wei-Chiang Huang, Taipei (TW); Ming-Hui Yeh, Taipei (TW); Wei-Ping Chan, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 32 days.

(21) Appl. No.: 17/159,477

(22) Filed: Jan. 27, 2021

(65) Prior Publication Data

US 2022/0163188 A1 May 26, 2022

(30) Foreign Application Priority Data

Nov. 20, 2020 (TW) .................................. 109140847

(51) Int. Cl.
| | |
|---|---|
| *H01H 13/83* | (2006.01) |
| *F21V 11/14* | (2006.01) |
| *F21V 8/00* | (2006.01) |
| *G06F 3/02* | (2006.01) |
| *F21V 29/50* | (2015.01) |

(52) U.S. Cl.
CPC .............. *F21V 11/14* (2013.01); *F21V 29/50* (2015.01); *G02B 6/0055* (2013.01); *G02B 6/0066* (2013.01); *G06F 3/0202* (2013.01); *H01H 13/83* (2013.01); *H01H 2219/06* (2013.01); *H01H 2219/062* (2013.01)

(58) Field of Classification Search
CPC ............. H01H 13/83; H01H 2219/062; H01H 2219/039; H01H 13/023; H01H 2219/06; H01H 2221/07; H01H 9/181; H01H 2219/036; H01H 2219/044; H01H 2013/026; H01H 9/16; H01H 2219/0622; H01H 2219/037; F21V 11/14; F21V 29/50; G02B 6/0055; G02B 6/0066; G06F 3/0202

See application file for complete search history.

(56) References Cited

U.S. PATENT DOCUMENTS

| | | | | |
|---|---|---|---|---|
| 7,841,791 B2* | 11/2010 | Iso | ......................... | H01H 13/83 |
| | | | | 400/490 |
| 8,714,850 B2* | 5/2014 | Ho | ......................... | H01H 13/16 |
| | | | | 345/170 |
| 2018/0218859 A1* | 8/2018 | Ligtenberg | ............. | H01H 13/86 |

* cited by examiner

*Primary Examiner* — Ahmed M Saeed
(74) *Attorney, Agent, or Firm* — Kirton McConkie; Evan R. Witt

(57) ABSTRACT

A keyboard device and a backlight module of the keyboard device are provided. The keyboard device includes a casing, the backlight module, a keyboard module and an expansion module. The backlight module includes a main body region and an extension region. The main body region and the extension region are connected with each other. A first light beam is outputted from the main body region to plural keys of the keyboard device. A second light beam is outputted from the extension region to the expansion module.

7 Claims, 6 Drawing Sheets

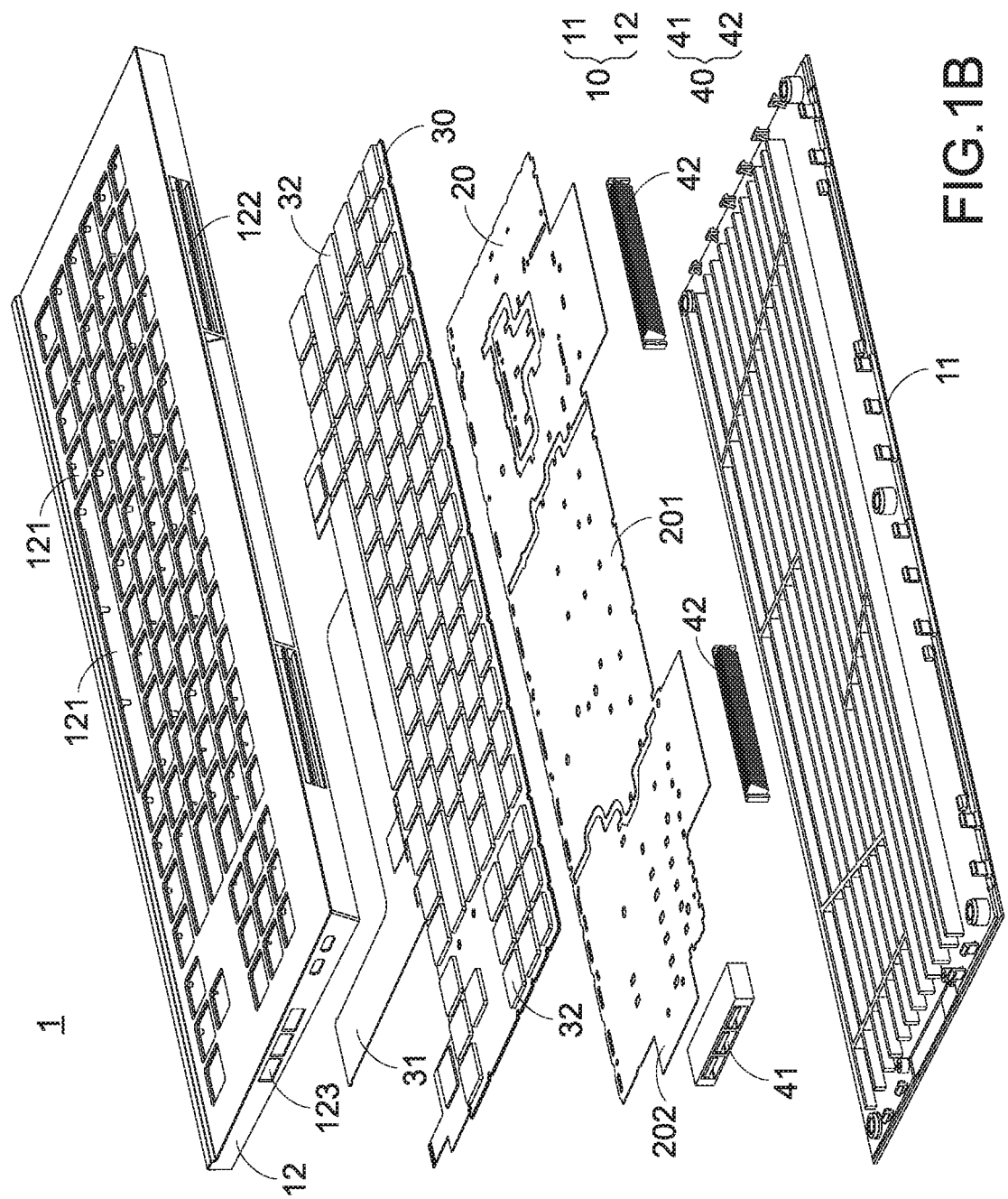

KEYBOARD DEVICE AND BACKLIGHT MODULE THEREOF

FIELD OF THE INVENTION

The present invention relates to an input device, and more particularly to a keyboard device.

BACKGROUND OF THE INVENTION

In modern societies, electronic devices become indispensable parts in human lives. The electronic devices are applied in many sectors, including food, clothing, housing, transportation, education and entertainment. Generally, the electronic device comprises a keyboard device.

In order to make the overall appearance of the electronic device more attractive to consumers and allow the user to conveniently use the electronic device in a dark environment, the keyboard device of the electronic device is usually equipped with a backlight light source. The backlight light source is used to project light beams to keys or expansion modules such as USB ports or optic disc drives. Consequently, the user can operate the keys or use the expansion modules of the electronic device in the dark environment.

As mentioned above, the keyboard device of the electronic device is equipped with the backlight light source to emit light beams. However, if the expansion module is required to produce a luminous visual effect, it is necessary to install an additional light source kit at the position of the expansion module in order to illuminate the expansion module. Generally, because of the additional light source kit, the process of assembling the electronic device is complicated and flexibility and freedom of installing the internal electronic circuit in the electronic device are reduced. Moreover, the additional light source kit occupies an internal space of the electronic device. Consequently, the overall structural design of the electronic device is adversely affected. In case that the additional internal accommodation space is increased, the overall volume or thickness of the electronic device is increased, and the portability of the electronic device is deteriorated.

For overcoming the drawbacks of the conventional technologies, there is a need of providing a keyboard device with a backlight module while achieving the easily assembled and slim purposes.

SUMMARY OF THE INVENTION

The present invention provides a keyboard device with a backlight module. The keyboard device is easily assembled and has a slim structure.

In accordance with an aspect of the present invention, a backlight module for a keyboard device is provided. The backlight module includes at least one light-emitting unit, a reflective layer, a light guide plate and a light-shielding layer. The at least one light-emitting unit is installed in the reflective layer. The light guide plate is located over the reflective layer. The light guide plate includes a main light-guiding part and at least one extensive light-guiding part. The at least one extensive light-guiding part is connected with the main light-guiding part. The light guide plate further includes a hollow portion corresponding to the at least one light-emitting unit. The light-shielding layer is located over the light guide plate. An edge of the light-shielding layer and an edge of the reflective layer are combined together. Moreover, plural first light-outputting holes are formed in the light-shielding layer corresponding to the main light-guiding part, and at least one second light-outputting hole is formed in the reflective layer corresponding to the extensive light-guiding part, formed in the light-shielding layer corresponding to the extensive light-guiding part, or located at a junction between the edge of the reflective layer and the edge of the light-shielding layer corresponding to the extensive light-guiding part.

In an embodiment, the at least one light-emitting unit emits a first light beam to plural keys of the keyboard device through the light guide plate and the plural first light-outputting holes.

In an embodiment, the at least one light-emitting unit emits a second light beam to at least one expansion module of the keyboard device through the light guide plate and the at least one second light-outputting hole.

In an embodiment, the expansion module includes an input/output interface, a heat dissipation block or a fan.

In an embodiment, the at least one light-emitting unit emits a second light beam to a light-transmissible pattern of the keyboard device through the light guide plate and the at least one second light-outputting hole.

In an embodiment, the light-transmissible pattern is formed on an upper cover of the keyboard device.

In accordance with an aspect of the present invention, a keyboard device is provided. The keyboard device includes a casing, a backlight module, a keyboard module and at least one expansion module. The casing includes an upper cover and a lower cover, which are combined together. The backlight module is located over the lower cover. The backlight module includes a main body region and an extension region. The backlight module includes plural first light-outputting holes in the main body region. In addition, the backlight module includes at least one second light-outputting hole in the extension region. The keyboard module is located over the backlight module. The keyboard module includes plural keys. The upper cover includes plural openings corresponding to the plural keys. The at least one expansion module is installed in the casing. The upper cover or the lower cover includes at least one expansion slot corresponding to the at least one expansion module. A first light beam is outputted from the plural first light-outputting holes to the plural keys. A second light beam is outputted from the at least one second light-outputting hole to the at least one expansion module.

In an embodiment, the expansion module includes an input/output interface, a heat dissipation block or a fan.

In an embodiment, the upper cover has a light-transmissible pattern, and the second light beam is outputted from the at least one second light-outputting hole to the light-transmissible pattern.

In an embodiment, the backlight module includes at least one light-emitting unit, a reflective layer, a light guide plate and a light-shielding layer. The at least one light-emitting unit is installed in the reflective layer. The light guide plate is located over the reflective layer. The light guide plate includes a main light-guiding part and at least one extensive light-guiding part. The at least one extensive light-guiding part is connected with the main light-guiding part. The light guide plate further includes a hollow portion corresponding to the at least one light-emitting unit. The light-shielding layer is located over the light guide plate. An edge of the light-shielding layer and an edge of the reflective layer are combined together. Moreover, the plural first light-outputting holes are formed in the light-shielding layer corresponding to the main body region, and the at least one second light-outputting hole is formed in the reflective layer corresponding to the extension region, formed in the light-shielding layer corresponding to the extension region, or located at a junction between the edge of the reflective layer and the edge of the light-shielding layer corresponding to the extension region.

From the above descriptions, the backlight module of the keyboard device comprises the main body region and the extension region. Due to the arrangement of the extension region, the backlight source for the keys can be directly applied to the expansion module. That is, it is unnecessary to install an additional light source kit for the expansion module. Consequently, the overall keyboard device is slimmer, the process of assembling the keyboard device is simplified, and the cost of assembling the keyboard device is reduced.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 1B is a schematic exploded view illustrating the keyboard device according to the embodiment of the present invention;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
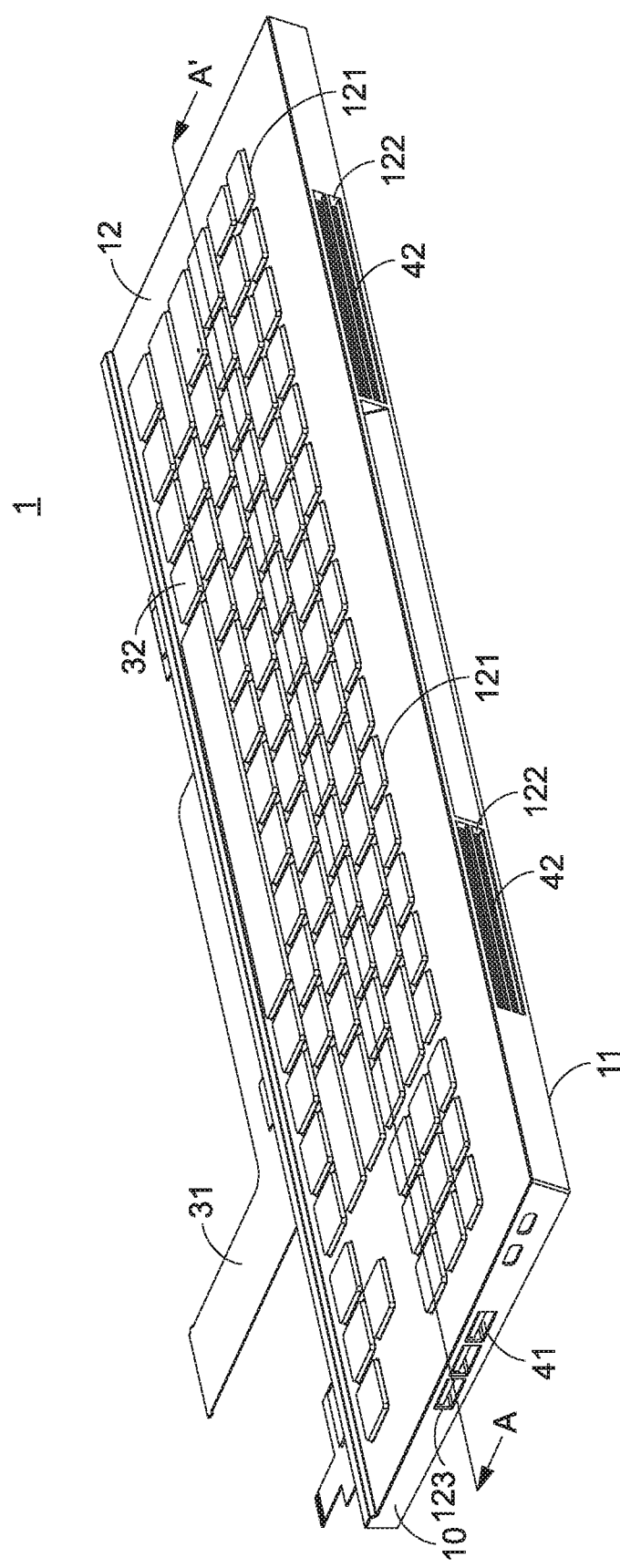
FIG. 1A is a schematic perspective view illustrating a keyboard device according to an embodiment of the present invention.

Please refer to FIGS. 1A and 1B. FIG. 1A is a schematic perspective view illustrating a keyboard device according to an embodiment of the present invention. FIG. 1B is a schematic exploded view illustrating the keyboard device according to the embodiment of the present invention. The keyboard device 1 comprises a casing 10, a backlight module 20, a keyboard module 30 and an expansion module 40.

The casing 10 comprises a lower cover 11 and an upper cover 12, which are combined with each other. The backlight module 20 is installed on the lower cover 11. The backlight module 20 comprises a main body region 201 and an extension region 202. The keyboard module 30 is located over the backlight module 20. The keyboard module 30 comprises a main circuit board 31 and plural keys 32. The plural key structures 32 are installed on the main circuit board 31. The upper cover 12 of the casing 10 comprises plural openings 121 corresponding to the plural keys 32. After the casing 10 is assembled, the keys 32 are exposed to or partially penetrated through the corresponding openings 121 of the upper cover 12. Consequently, the keys 32 can be pressed down by the user. Moreover, the main body region 201 of the backlight module 20 emits light beams to the keys 32. Consequently, the keys 32 can provide the luminous visual effects.

Please refer to FIG. 1B again. The expansion module 40 is installed on the casing 10. The upper cover 12 comprises expansion slots 122 and 123 corresponding to the expansion module 40. In an embodiment, the expansion module 40 comprises an input/output (I/O) interface 41 and heat dissipation blocks 42. For example, the I/O interface 41 is a USB interface. After the casing 10 is assembled, the I/O interface 41 and the heat dissipation blocks 42 are respectively exposed to the expansion slots 122 and 123. Moreover, the light beams can be transferred from the extension region 202 of the backlight module 20 to the expansion module 40 (i.e., the I/O interface 41 and the heat dissipation blocks 42). Consequently, the I/O interface 41 and the heat dissipation blocks 42 can provide the luminous visual effects.

In this embodiment, the expansion slots 122 and 123 are installed in the upper cover 12. It is noted that the installation positions of the expansion slots may be varied according to the practical requirements. For example, in another embodiment, the expansion slots are installed in arbitrary positions of the lower cover 11.

Figure 2:
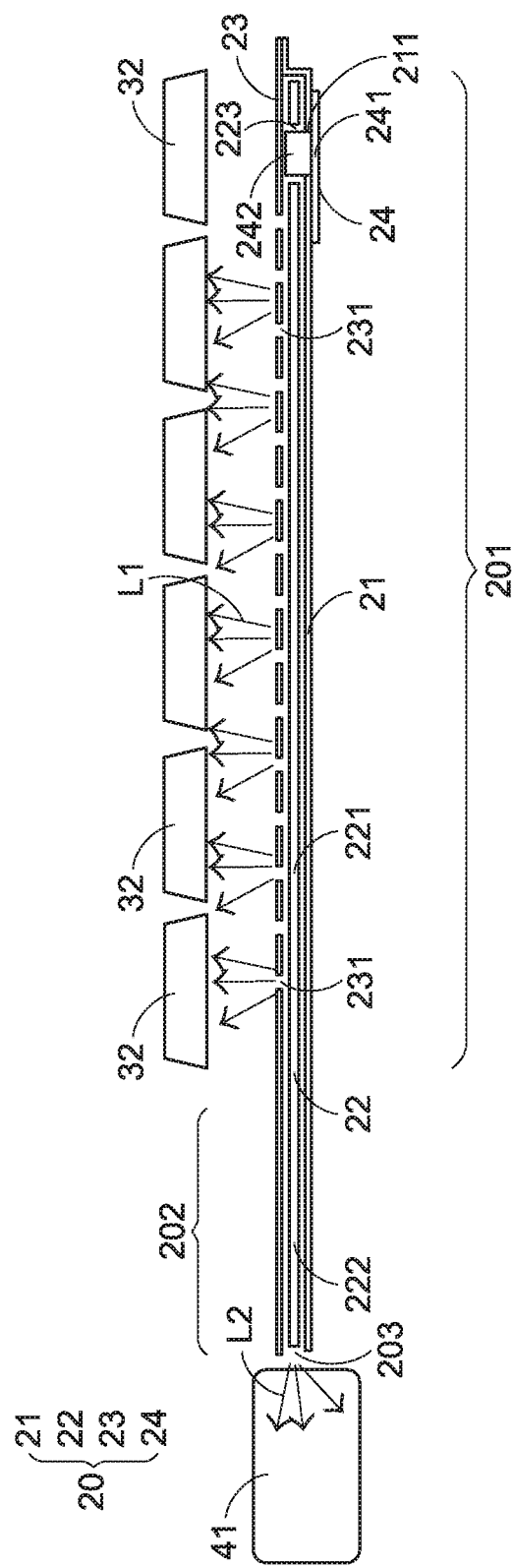
FIG. 2 is a schematic cross-sectional view illustrating a first example of the keyboard device as shown in FIG. 1A and taken along the line A-A'.

FIG. 2 is a schematic cross-sectional view illustrating a first example of the keyboard device as shown in FIG. 1A and taken along the line A-A'. For illustration, the lower cover 11 and the upper cover 12 of the casing 10, the main circuit board 31 of the keyboard module 30 and the supporting structures of the keys 32 are not shown in FIG. 2. As shown in FIG. 2, the backlight module 20 comprises a reflective layer 21, a light guide plate 22, a light-shielding layer 23 and a light-emitting unit 24. The light-emitting unit 24 is installed in the reflective layer 21. In an embodiment, the light-emitting unit 24 comprises a flexible circuit board 241 and a light-emitting chip 242. The light-emitting chip 242 is installed on the flexible circuit board 241. For example, the light-emitting chip 242 is a light emitting diode (LED) chip or an electroluminescence (EL) chip. In addition, the portion of the reflective layer 21 in the main body region 201 is equipped with an installation hole 211. When the top surface of the flexible circuit board 241 is attached on the bottom surface of the reflective layer 21, the light-emitting chip 242 is accommodated within the installation hole 211. The light guide plate 22 is located over the reflective layer 21. The light guide plate 22 comprises a main light-guiding part 221 and an extensive light-guiding part 222. The extensive light-guiding part 222 is connected with the main light-guiding part 221. The main light-guiding part 221 is aligned with the main body region 201 of the backlight module 20. The extensive light-guiding part 222 is aligned with the extension region 202 of the backlight module 20. Moreover, the light guide plate 22 further comprises a hollow portion 223 corresponding to the light-emitting unit 24. The light-emitting chip 242 of the light-emitting unit 24 is also accommodated within the hollow portion 223. The light-shielding layer 23 is located over the light guide plate 22. The edge of the light-shielding layer 23 and the edge of the reflective layer 21 are combined together to cover the entire of the light guide plate 22. In an embodiment, the portion of the light-shielding layer 23 corresponding to the main body region 201 of the backlight module 20 comprises plural first light-outputting holes 231.

The junction between the edge of the reflective layer 21 and the edge of the light-shielding layer 23 corresponding to the extension region 202 of the backlight module 20 comprises a second light-outputting hole 203.

Please refer to FIG. 2 again. When the light-emitting unit 24 is enabled, the light-emitting chip 242 emits light beams and the light beams are transferred through the light guide plate 22 along the cross section of the light guide plate 22 in a side-view lighting manner. After portions of light beams are subjected to reflection and refraction in the light guide plate 22, a first light beam L1 is outputted from the first light-outputting holes 231. Then, the first light beam L1 is projected to the keys 32. Consequently, the keys 32 provide the luminous visual effects. On the other hand, after other portions of light beams are subjected to reflection and refraction in the light guide plate 22, a second light beam L2 is outputted from the second light-outputting hole 203. Then, the second light beam L2 is projected to the I/O interface 41. Consequently, the I/O interface 41 provides the luminous visual effect. In this embodiment, the light-emitting unit 24 emits light beams in the side-view lighting manner. It is noted that the lighting manner of the light-emitting unit 24 may be varied according to the practical requirements. For example, in some other embodiments, the light-emitting unit 24 emits light beams in a top-view lighting manner.

Figure 3:
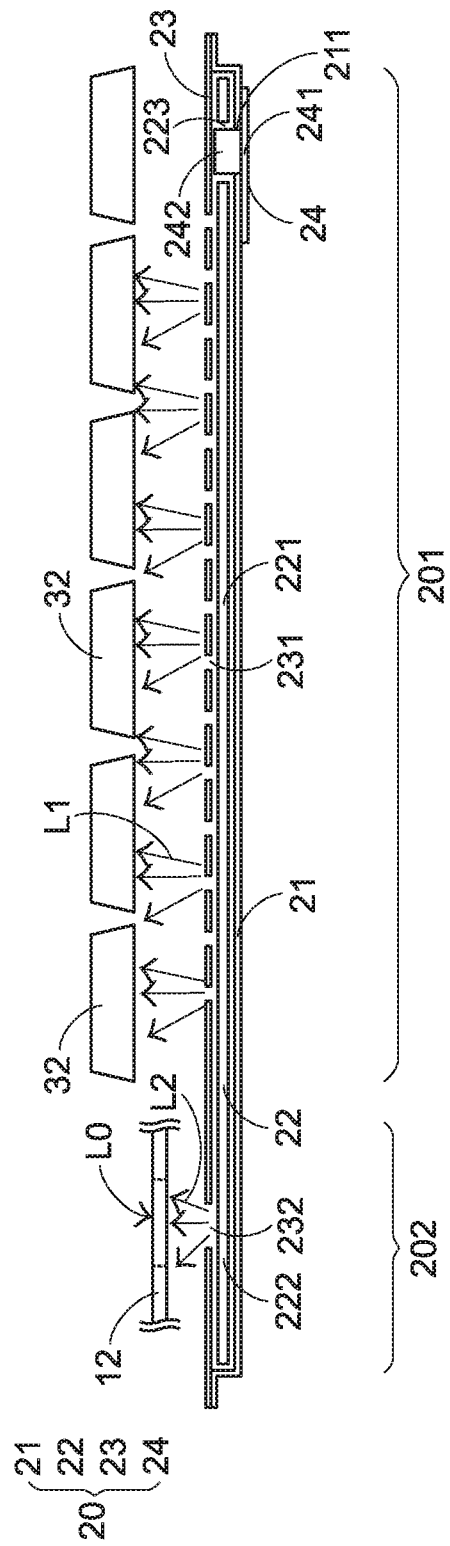
FIG. 3 is a schematic cross-sectional view illustrating a second example of the keyboard device as shown in FIG. 1A and taken along the line A-A'.

FIG. 3 is a schematic cross-sectional view illustrating a second example of the keyboard device as shown in FIG. 1A and taken along the line A-A'. The functions of the components of the backlight module 20 in this embodiment are similar to those in the embodiment of FIG. 2, and not redundantly described herein. In comparison with the embodiment of FIG. 2, the upper cover 12 of the keyboard device of this embodiment further has a light-transmissible pattern LO. For example, the light-transmissible pattern LO is a picture, a text, a number, a symbol, a logo or a combination thereof. Moreover, the extension region 202 of the backlight module 20 is aligned with the light-transmissible pattern LO, and a portion of the light-shielding layer 23 corresponding to the extension region 202 of the backlight module 20 has a second light-outputting hole 232. When the light-emitting unit 24 is enabled, the light-emitting chip 242 emits light beams and the light beams are transferred through the light guide plate 22 in a side-view lighting manner. After portions of light beams are subjected to reflection and refraction in the light guide plate 22, a second light beam L2 is outputted from the second light-outputting hole 232. Then, the second light beam L2 is projected to the light-transmissible pattern LO. Consequently, the light-transmissible pattern LO provides the luminous visual effect.

Figure 4:
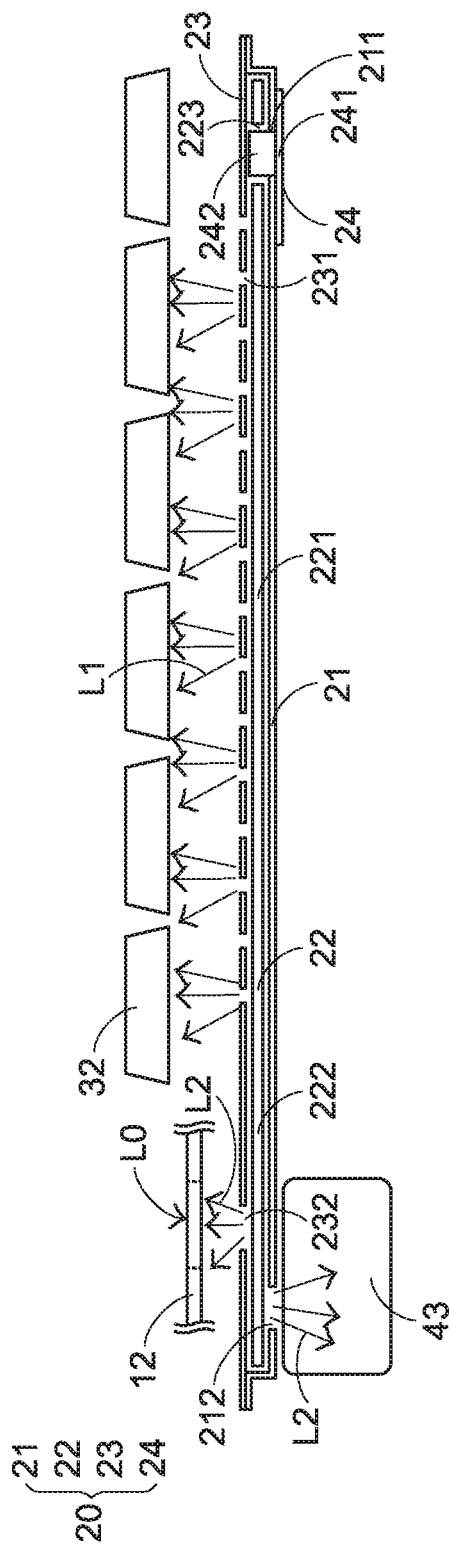
FIG. 4 is a schematic cross-sectional view illustrating a third example of the keyboard device as shown in FIG. 1A and taken along the line A-A'.

FIG. 4 is a schematic cross-sectional view illustrating a third example of the keyboard device as shown in FIG. 1A and taken along the line A-A'. The functions of the components of the backlight module 20 in this embodiment are similar to those in the embodiment of FIG. 3, and not redundantly described herein. Similarly, the upper cover 12 of the keyboard device of this embodiment further has a light-transmissible pattern LO. In comparison with the embodiment of FIG. 3, the keyboard device of this embodiment further comprises a fan 43 between the backlight module 20 and the lower cover 11 (see FIG. 1B). Moreover, a portion of the light-shielding layer 23 and a portion of the reflective layer 21 corresponding to the extension region 202 of the backlight module 20 have second light-outputting holes 232 and 212, respectively. When the light-emitting unit 24 is enabled, the light-emitting chip 242 emits light beams and the light beams are transferred through the light guide plate 22 in a side-view lighting manner. After portions of light beams are subjected to reflection and refraction in the light guide plate 22, a second light beam L2 is outputted from the second light-outputting holes 232 and 212. Then, the second light beam L2 is projected upwardly to the light-transmissible pattern LO and projected downwardly to the fan 43. Consequently, the light-transmissible pattern LO and the fan 43 provide the luminous visual effects.

Figure 5:
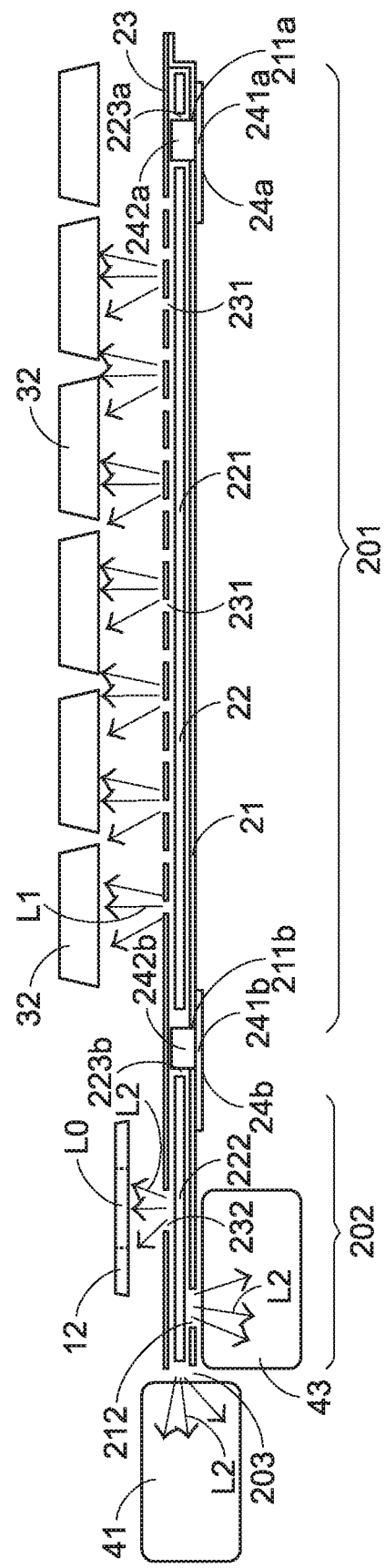
FIG. 5 is a schematic cross-sectional view illustrating a fourth example of the keyboard device as shown in FIG. 1A and taken along the line A-A'.

FIG. 5 is a schematic cross-sectional view illustrating a fourth example of the keyboard device as shown in FIG. 1A and taken along the line A-A'. The functions of the components of the backlight module 20 in this embodiment are similar to those in the embodiment of FIGS. 2 and 4, and not redundantly described herein. In comparison with the embodiment of FIGS. 2 and 4, the reflective layer 21 of the keyboard device of this embodiment comprises two installation holes 211a and 211b. The installation hole 211a is located at a lateral side of the main body region 201 of the backlight module 20. The installation hole 211b is located at the junction between the main body region 201 and the extension region 202 of the backlight module 20. Moreover, two light-emitting units 24a and 24b are accommodated within the installation holes 211a and 211b, respectively. The light-emitting unit 24a comprises a flexible circuit board 241a and a light-emitting chip 242a, and the light-emitting chip 242a is installed on the flexible circuit board 241a. The light-emitting unit 24b comprises a flexible circuit board 241b and a light-emitting chip 242b, and the light-emitting chip 242b is installed on the flexible circuit board 241b. The light-emitting chips 242a and 242b can emit light beams with different tones.

When the light-emitting unit 24a is enabled, the light-emitting chip 242a emits light beams with a first tone and the light beams are transferred through the main light-guiding part 221 of the light guide plate 22 along the main light-guiding part 221 of the light guide plate 22 in a side-view lighting manner. After portions of light beams are subjected to reflection and refraction in the main light-guiding part 221 of the light guide plate 22, a first light beam L1 is outputted from the first light-outputting holes 231. Then, the first light beam L1 is projected to the keys 32. Consequently, the keys 32 provide the luminous visual effects corresponding to a first color. When the light-emitting unit 24b is enabled, the light-emitting chip 242b emits light beams with a second tone and the light beams are transferred through the extensive light-guiding part 222 of the light guide plate 22 along the of the light guide plate 22 in a side-view lighting manner. After the light beams are subjected to reflection and refraction in the extensive light-guiding part 222 of light guide plate 22, a second light beam L2 is outputted from the second light-outputting holes 212, 203 and 232. Then, the second light beam L2 is projected to the fan 43, the I/O interface 41 and the light-transmissible pattern LO. Consequently, the fan 43, the I/O interface 41 and the light-transmissible pattern LO provide luminous visual effects corresponding to a second color.

From the above descriptions, the backlight module of the keyboard device comprises the main body region and the extension region. Due to the arrangement of the extension region, the backlight source for the keys can be directly applied to the expansion module. That is, it is unnecessary to install an additional light source kit for the expansion module. Consequently, the overall keyboard device is slimmer, the process of assembling the keyboard device is simplified, and the cost of assembling the keyboard device is reduced. In other words, the keyboard device of the present invention is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A backlight module for a keyboard device, the backlight module comprising: at least one light-emitting unit; a reflective layer, wherein the at least one light-emitting unit is installed in the reflective layer; a light guide plate located over the reflective layer, wherein the light guide plate comprises a main light-guiding part and at least one extensive light-guiding part, wherein the at least one extensive light-guiding part is connected with the main light-guiding part, and the light guide plate further comprises a hollow portion corresponding to the at least one light-emitting unit; and a light-shielding layer located over the light guide plate, wherein an edge of the light-shielding layer and an edge of the reflective layer are combined together, wherein plural first light-outputting holes are formed in the light-shielding layer corresponding to the main light-guiding part, and at least one second light-outputting hole is formed in the reflective layer corresponding to the extensive light-guiding part, formed in the light-shielding layer corresponding to the extensive light-guiding part, or located at a junction between the edge of the reflective layer and the edge of the light-shielding layer corresponding to the extensive light-guiding part; wherein the at least one light-emitting unit emits a first light beam to plural keys of the keyboard device through the light guide plate and the plural first light-outputting holes; wherein the at least one light-emitting unit emits a second light beam to at least one expansion module of the keyboard device through the light guide plate and the at least one second light-outputting hole.

2. The backlight module according to claim 1, wherein the expansion module includes an input/output interface, a heat dissipation block or a fan.

3. The backlight module according to claim 1, wherein the at least one light-emitting unit emits a second light beam to a light-transmissible pattern of the keyboard device through the light guide plate and the at least one second light-outputting hole.

4. The backlight module according to claim 3, wherein the light-transmissible pattern is formed on an upper cover of the keyboard device.

5. A keyboard device, comprising: a casing comprising an upper cover and a lower cover, which are combined together; a backlight module located over the lower cover, and comprising a main body region and an extension region, wherein the backlight module comprises plural first light-outputting holes in the main body region, and the backlight module comprises at least one second light-outputting hole in the extension region; a keyboard module located over the backlight module, and comprising plural keys, wherein the upper cover comprises plural openings corresponding to the plural keys; and at least one expansion module installed in the casing, wherein the upper cover or the lower cover comprises at least one expansion slot corresponding to the at least one expansion module, wherein a first light beam is outputted from the plural first light-outputting holes to the plural keys, and a second light beam is outputted from the at least one second light-outputting hole to the at least one expansion module; wherein the backlight module comprises: at least one light-emitting unit; a reflective layer, wherein the at least one light-emitting unit is installed in the reflective layer; a light guide plate located over the reflective layer, wherein the light guide plate comprises a main light-guiding part and at least one extensive light-guiding part, wherein the at least one extensive light-guiding part is connected with the main light-guiding part, and the light guide plate further comprises a hollow portion corresponding to the at least one light-emitting unit; and a light-shielding layer located over the light guide plate, wherein an edge of the light-shielding layer and an edge of the reflective layer are combined together, wherein the plural first light-outputting holes are formed in the light-shielding layer corresponding to the main body region, and the at least one second light-outputting hole is formed in the reflective layer corresponding to the extension region, formed in the light-shielding layer corresponding to the extension region, or located at a junction between the edge of the reflective layer and the edge of the light-shielding layer corresponding to the extension region.

6. The keyboard device according to claim 5, wherein the expansion module includes an input/output interface, a heat dissipation block or a fan.

7. The keyboard device according to claim 5, wherein the upper cover has a light-transmissible pattern, and the second light beam is outputted from the at least one second light-outputting hole to the light-transmissible pattern.

* * * * *